United States Patent [19]
Jensen

[11] Patent Number: 4,488,452
[45] Date of Patent: Dec. 18, 1984

[54] DRIVE MECHANISM FOR A FUEL PUMP OF A REVERSIBLE TWO-STROKE ENGINE

[75] Inventor: Finn Q. Jensen, Copenhagen, Denmark

[73] Assignee: B&W Diesel A/S, Denmark

[21] Appl. No.: 369,143

[22] Filed: Apr. 16, 1982

[30] Foreign Application Priority Data

May 6, 1981 [DK] Denmark ............................ 2016/81

[51] Int. Cl.$^3$ ...................... F16H 53/06; F01L 13/02; F04B 39/10

[52] U.S. Cl. .................................. 74/569; 123/41 R; 417/499

[58] Field of Search ............ 123/41 R, 41 E; 74/569, 74/55; 417/499

[56] References Cited

U.S. PATENT DOCUMENTS

| | | | |
|---|---|---|---|
| 1,294,077 | 2/1919 | Fencheue | 123/41 |
| 2,599,479 | 6/1952 | Petersen | 123/41 |

FOREIGN PATENT DOCUMENTS

| | | | |
|---|---|---|---|
| 27660 | 10/1906 | Austria | 74/55 |
| 146351 | 4/1931 | Switzerland . | |
| 14091 | of 1911 | United Kingdom . | |
| 233245 | 5/1925 | United Kingdom . | |
| 1328096 | 8/1973 | United Kingdom | 417/499 |

*Primary Examiner*—Alexander Crosz
*Assistant Examiner*—Vinh Luong
*Attorney, Agent, or Firm*—Bacon & Thomas

[57] ABSTRACT

The mechanism comprises a rectilinearly movable roller guide which at its upper end can be coupled to the plunger of the fuel pump and in the lower end of which an arm is journalled by means of a pivot pin. The arm supports a follower roller which is held in contact with an actuating cam on the rotating control shaft of the engine. To the arm there is secured a pin engaging in a vertical guideway which can be moved horizontally so as to pivot the arm between two end positions each corresponding to one direction of rotation of the engine. Each end position is defined by the mutual engagement, under the influence of the force acting on the follower roller, between two abutment surfaces provided on the arm and the roller guide, respectively.

2 Claims, 4 Drawing Figures

DRIVE MECHANISM FOR A FUEL PUMP OF A REVERSIBLE TWO-STROKE ENGINE

BACKGROUND OF THE INVENTION

This invention relates to a drive mechanism for a fuel pump of a reversible two-stroke internal combustion engine, comprising a follower roller cooperating with an actuating cam on the control shaft of the engine, a roller guide adapted for being coupled to the plunger of the pump, which guide is guided for reciprocating movement perpendicular to the control shaft and spring-biased towards the control shaft, an arm at one end of which the follower roller is rotatably supported by means of a journal pin, while the opposite end of the arm is connected to the roller guide by means of a pivot joint, the axis of which is parallel to the axis of rotation of the control shaft, and means for pivoting the arm relative to the roller guide between two end positions so as to shift the axis of the journal pin from one side of a plane through the axes of the pivot joint and the control shaft to the opposite side of that plane and vice versa.

During operation of the engine the arm supporting the follower roller is maintained in one of its end positions, in which the line of contact between the cam profile and the roller, when the associated engine piston is in its top dead centre, is laterally offset from the plane referred to. When the direction of rotation of the engine's crankshaft is to be reversed the arm is pivoted to its other end position whereby the axis of the follower roller as well as the contact point in the top dead centre position are shifted to the opposite side of said plane. It is thus possible, by means of a single, symmetric or substantially symmetric, cam and with unchanged angular position of the control shaft relative to the crankshaft, to obtain a desired fuel pump lead in both directions of rotation. A reversing mechanism for the fuel pump drive can thus be dispensed with.

From U.S. Pat. No. 2,599,479 there is known a drive mechanism of the kind referred to in which the arm supporting the follower roller is connected to an elongate reversing shaft which extends along the engine and which can be rotated about its axis between two extreme positions, each corresponding to one of the engine's directions of rotation, by means of a linkage consisting of a lever secured to the reversing shaft and a link between that lever and the roller supporting arm. Due to the geometry of the linkage the supporting arm effects, in addition to a rectilinear movement corresponding to the reciprocating movement of the roller guide, a small oscillating angular movement during each rotation of the control shaft. As a result the bearing pin between the supporting arm and the roller guide and the two bearing pins of the link effect small oscillating rotations which in practice makes it difficult to build up a sufficient lubricating film in the three bearings. A further disadvantage of the known mechanism is that the transverse component of the contact force between the roller and the cam, i.e. the force component which is perpendicular to the longitudinal axis of the supporting arm, is taken up by the link and thus exerts bending and torsional loads on the reversing shaft. The resulting deformations of the long reversing shaft lead to more or less incalculable displacements of the points in which the links are hinged to the arms and hence to undesired deviations between the fuel pump lead of individual engine cylinders. The magnitude of the transverse force components can be reduced by increasing the length of the supporting arm, but then the total height of the fuel pump above the control shaft increases and this can make it difficult to obtain the space required when an engine piston shall be pulled up from its cylinder and moved laterally above the pump in order to bring the piston clear of the engine for inspection, replacement of piston rings etc.

SUMMARY OF THE INVENTION

According to the present invention a drive mechanism of the kind initially referred to is characterized in that for defining each end position of the pivotal arm there is provided one pair of cooperating abutment surfaces on the roller guide and the pivotal arm, respectively, said abutment surfaces being located at opposite sides of said plane and spaced from said plane such that in any angular position of the control shaft the line of action of the force exerted by the follower roller on its journal pin passes between the axis of the pivot joint and the operative pair of abutment surfaces.

In a drive mechanism according to the invention the force acting between the actuating cam and the follower roller is taken up, directly and completely, by two reaction forces one of which acts in the pivot joint between the arm and the roller guide while the other reaction force acts in that pair of abutment surfaces on the arm and the roller guide, respectively, which corresponds to the engine's instantaneous direction of rotation. Thus, the force on the follower roller is transferred in its entirety to the roller guide whereas the elements, which serve for pivoting the arm between its end positions, are entirely free of stresses during operation of the engine since they have to transfer forces only during a reversing operation. As a consequence thereof and of the unyielding fixation of the arm in its instantaneous end position under the influence of the force from the follower roller, a predetermined fuel pump lead can be maintained independent of any variations in the back pressure on the pump plunger and, thus, in the force acting between the roller and the cam during the pump stroke. The length of the arm between the axis of the follower roller and the pivot joint at the opposite end can be chosen as short as possible from purely structural considerations which reduces the total height of the fuel pump.

The means for pivoting the arm may comprise an elongate guideway extending in parallel with the direction of movement of the roller guide and in which a pin or sliding shoe secured to the arm engages with a clearance, and means for displacing the guideway in a direction perpendicular to its longitudinal direction and to the axis of the pivot joint.

BRIEF DESCRIPTION OF THE DRAWINGS

The invention will be explained in more detail below with reference to the accompanying, somewhat schematic drawings in which.

DETAILED DESCRIPTION

Figure 2:
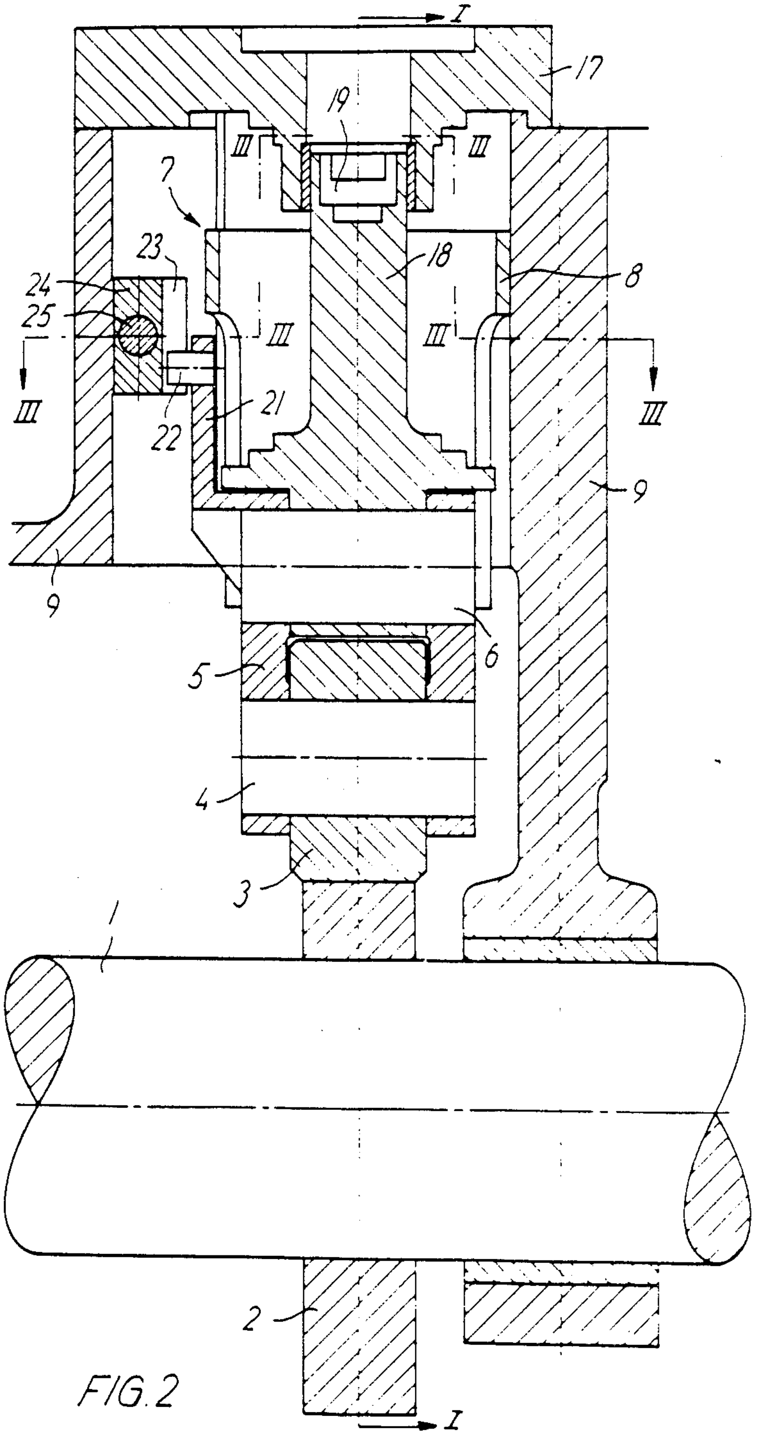
FIG. 2 is a section along the broken line II—II—II—II of FIG. 1.

A reversible two-stroke Diesel engine not shown in detail in the drawings comprises a control shaft 1 rotating in synchronism with the engine crankshaft and to which there are secured actuating cams 2, one for each of the fuel pumps (not shown) of the engine. Each cam 2 cooperates with a follower roller 3, which by means of a pin 4 is journalled for rotation in the lower, bifurcated end of an arm 5. By means of a pin 6 arm 5 is pivotally journalled in a roller guide 7, which comprises a cylindric skirt 8 that serves for guiding the roller guide for vertical movement relative to a housing 9 secured to the frame (not shown) of the engine. As shown in FIG. 2 control shaft 1 is supported in housing 9 at suitable locations along its length.

Figure 1:
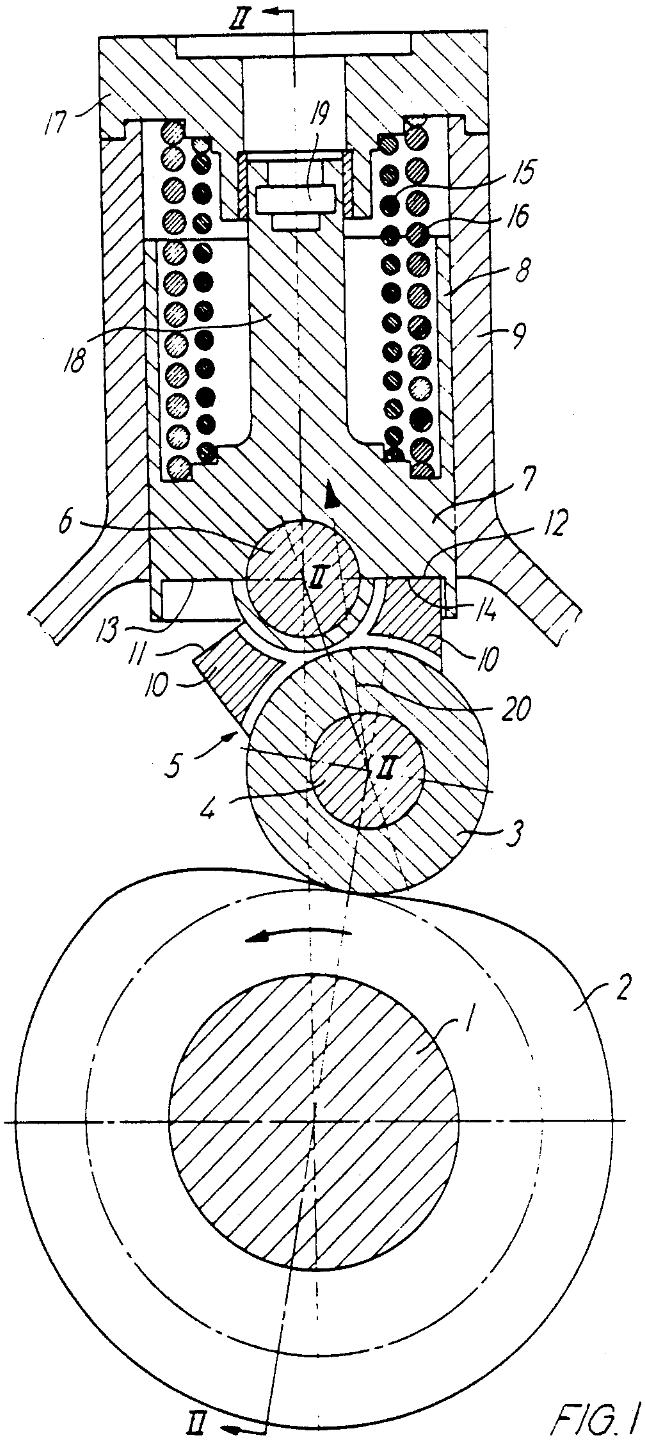
FIG. 1 is a vertical section, along line I—I of FIG. 2, through the roller guide of a fuel pump (not shown) with follower roller and actuating cam on the engine's control shaft.
Figure 4:
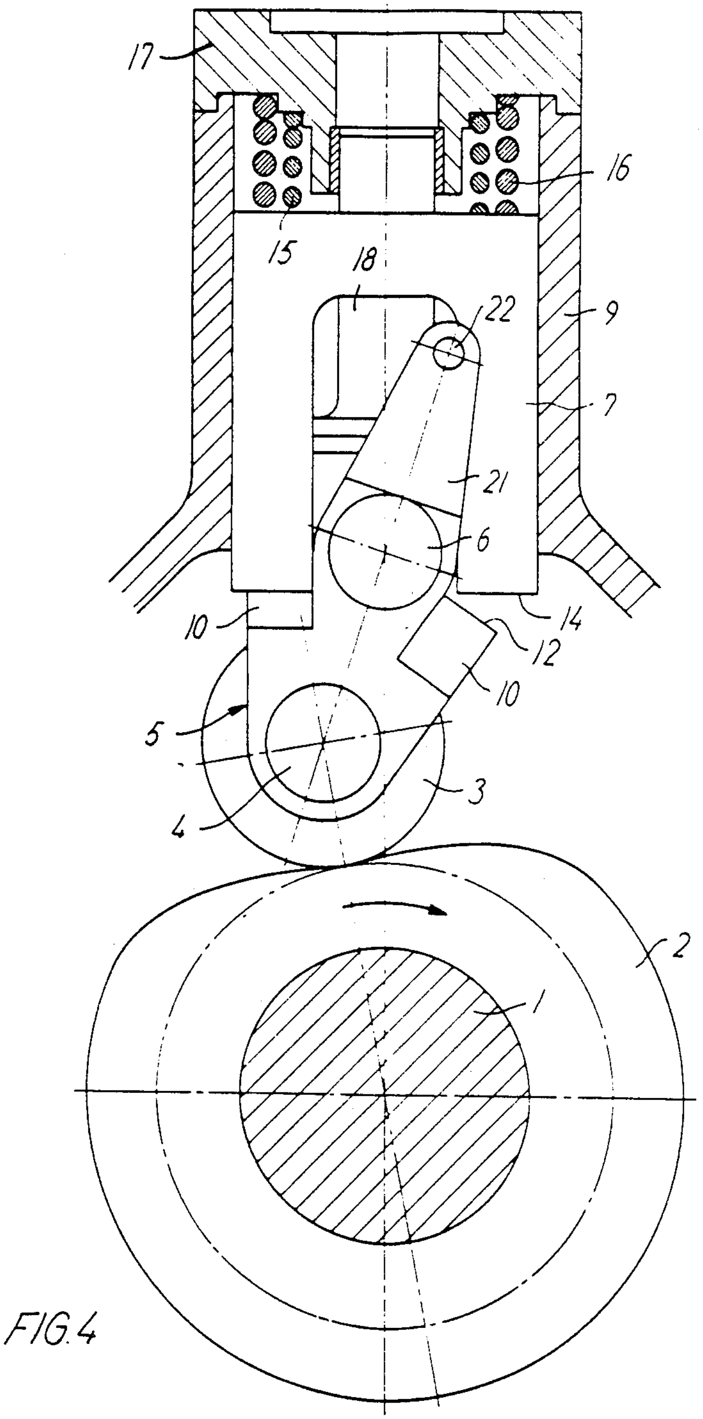
FIG. 4 is a view corresponding to FIG. 1 in which the roller guide and the pivotal arm are shown in elevation, after reversing of the engine.

The upper ends of the two parallel portions of arm 5, in which roller 3 is journalled, are connected by means of two yokes 10, see FIGS. 1 and 4, and the upper side of each yoke is formed as a flat abutment surface 11 and 12, respectively. On the lower side of roller guide 7 there are formed opposed abutment surfaces 13 and 14, respectively, each of which determines, together with one of the abutment surfaces on arm 5, one end position of the pivoting movement of the arm relative to the roller guide.

FIG. 1 shows arm 5 in that position in which surfaces 12 and 14 abut against one another corresponding to the control shaft 1 rotating anti-clockwise, as shown by an arrow on cam 2.

Figure 3:
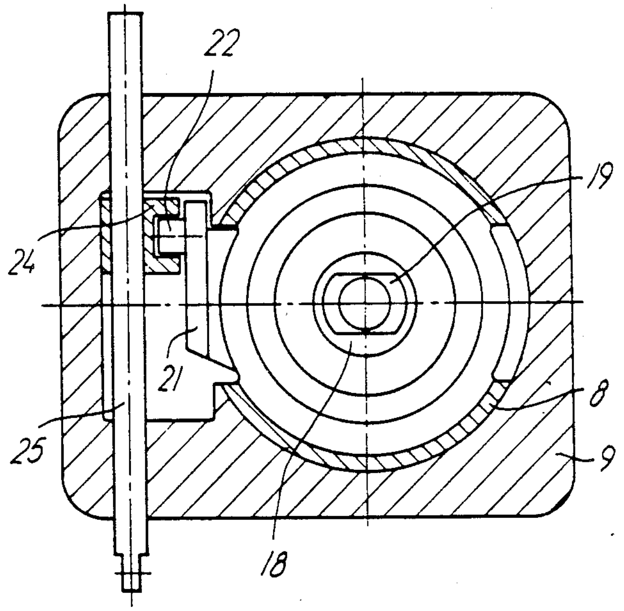
FIG. 3 is a section along the broken line III—III—III—III—III—III of FIG. 2 with the top cover of the mechanism removed.

The contact between cam 2 and roller 3 is ensured by means of two helical compression springs 15 and 16 (shown in FIG. 1, but omitted from FIGS. 2 and 3 for clarity) acting between roller guide 7 and a top cover 17 which is secured to housing 9 and on which the fuel pump (not shown) is mounted. Roller guide 7 is formed with an upwardly extending central stem 18 which at its upper end is guided in cover 17 and in the upwardly facing end face of which there is a recess 19 for coupling the roller guide to the plunger (not shown) of the fuel pump in a known manner (àa bayonet lock).

During the rotation of control shaft 1 the direction of the force, which acts in the contact line between cam 2 and roller 3, and which is transferred through pin 4 to arm 5, will vary dependent on the cam profile. In the position shown in FIG. 1, in which the roller touches the lowermost point of the cam profile immediately prior to the upward or delivery stroke of the pump plunger, the force direction coincides with the line connecting the centres of pin 4 and shaft 1, so that the major part of the force is transferred to the roller guide through surfaces 12 and 14. An arrow 20 in FIG. 1 indicates the force direction at the moment—occurring during the upward pump stroke when shaft 1 has rotated through a certain angle from the position shown in FIG. 1—when the angular deviation of the force direction from the plane including the centre lines of pins 6 and 4 is a minimum. It will be seen that also in this extreme position in which a larger part of the force is transferred through pin 6 there is a positive contact pressure between surfaces 12 and 14 which ensures the stability of the angular position of arm 5.

FIG. 4 shows the parts of the mechanism in the opposite end position of arm 5 which position is symmetric with that of FIG. 1 about the longitudinal axis of roller guide 7, and which corresponds to the opposite direction of rotation of the engine's crankshaft and control shaft. FIG. 4 also shows an upwardly directed extension 21 of arm 5 in which there is secured a pin 22 which engages with a lateral clearance in an elongate vertical groove 23 in a slide 24, see also FIGS. 2 and 3. Slide 24 is secured to a horizontal rod 25 which is slidably supported in housing 9 and which at one of its ends is adapted to be connected to an element (not shown) by means of which the rod can be moved horizontally between two end positions so as to pivot, via pin 22, arm 5 between the two end positions of that arm described above. Said element for moving rod 25 may e.g. be a pneumatic or hydraulic ram or a rotatable shaft extending along the engine and connected to the respective rods 25 by means of links.

The invention is equally applicable in engines having piston controlled inlet and outlet ports in the cylinder wall and in uniflow scavenge engines having an exhaust valve which, in particular in connection with constant pressure turbocharging, can be actuated by a symmetric or substantially symmetric cam which does not require any change of the angular relationship between the crankshaft and the control shaft when the engine is to be reversed.

I claim:

1. A drive mechanism for a fuel pump of a reversible two-stroke internal combustion engine, comprising:

a housing, a roller guide guided in said housing for reciprocating movement perpendicular to a rotary control shaft of the engine and having coupling means for the plunger of a fuel pump, an arm connected at one end to said roller guide by means of a pivot joint, the axis of which is parallel to the axis of rotation of said control shaft, a follower roller rotatably supported at the opposite end of said arm by means of a journal pin, spring means biasing said roller guide towards said control shaft for maintaining contact between said follower roller and an actuating cam secured to said control shaft, and means for pivoting the arm relative to the roller guide between two end positions so as to shift the axis of the journal pin from one side of a plane extending through the axes of the pivot joint and the control shaft to the opposite side of that plane and vice versa, means for defining each end position of the arm comprising pairs of cooperating abutment surfaces between the roller guide and the arm, respectively, said pairs of surfaces located on opposite sides of said plane and each pair of abutment surfaces being located on one side of said plane and spaced from said plane such that in any angular position of the control shaft the line of action of a force exerted by the follower roller on its journal pin when the follower roller is actuated by the actuating cam passes between the axis of the pivot joint and an operative pair of abutment surfaces.

2. A drive mechanism as claimed in claim 1, said means for pivoting the arm comprising an elongate guideway extending in parallel with the direction of movement of the roller guide; a pin secured to the arm and engaging in said guideway with a lateral clearance; and means for displacing the guideway in a direction perpendicular to its longitudinal direction and to the axis of the pivot joint.

* * * * *